United States Patent
Mikolai et al.

(10) Patent No.: US 6,848,737 B2
(45) Date of Patent: Feb. 1, 2005

(54) ACCESS DOOR RELEASE HANDLE (75) Inventors: Donald G. Mikolai, Dearborn, MI (US); Matthew Carey, Brownstown, MI (US); Muhammed Ayub, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 10/249,836

(22) Filed: May 12, 2003

(65) Prior Publication Data
US 2004/0104595 A1 Jun. 3, 2004

Related U.S. Application Data
(60) Provisional application No. 60/430,297, filed on Dec. 2, 2002.

(51) Int. Cl.[7] .................................................. B60J 5/04
(52) U.S. Cl. ..................... 296/146.9; 49/503; 292/336.3
(58) Field of Search ........................ 296/146.9, 146.1, 296/147, 202; 49/501, 503, 366, 367; 292/336.3, DIG. 23, DIG. 27, DIG. 21

(56) References Cited

U.S. PATENT DOCUMENTS

| | | | |
|---|---|---|---|
| 2,612,397 A | | 9/1952 | Stutt |
| 2,822,203 A | * | 2/1958 | Griswold, Jr. et al. ...... 292/144 |
| 2,827,321 A | * | 3/1958 | Leslie et al. .................... 292/5 |
| 4,009,537 A | * | 3/1977 | Hubbard ....................... 49/319 |
| 5,749,611 A | | 5/1998 | Watson et al. |
| 6,059,352 A | | 5/2000 | Heldt et al. |
| 6,449,904 B1 | * | 9/2002 | Paasonen ...................... 49/103 |
| 6,550,845 B1 | * | 4/2003 | Pietryga ................... 296/146.1 |
| 6,564,510 B2 | * | 5/2003 | Juntunen et al. .............. 49/103 |
| 6,616,214 B2 | * | 9/2003 | Wattebled ................ 296/146.1 |
| 6,694,676 B2 | * | 2/2004 | Sakamoto et al. ............ 49/366 |
| 6,752,440 B2 | * | 6/2004 | Spurr ...................... 292/336.3 |
| 2003/0111863 A1 | * | 6/2003 | Weyerstall et al. ...... 296/146.1 |

* cited by examiner

Primary Examiner—D. Glenn Dayoan
Assistant Examiner—H. Gutman
(74) Attorney, Agent, or Firm—Gigette M. Bejin (57) ABSTRACT A vehicle 7 is provided having a vehicle body 10 with an opening 16 having first and second ends 18, 20. The vehicle body 7 has a first door 22 and a second door 28, which has a latch connection 42 with the vehicle body between the first and second ends 18, 20. A release handle mechanism 54, accessible from an interior of the vehicle body is provided for the second door 28. The release handle mechanism 54 is also accessible from an exterior of the vehicle body when the first door 22 is open.

24 Claims, 10 Drawing Sheets

ACCESS DOOR RELEASE HANDLE

This application claims the benefit of U.S. Provisional application Ser. No. 60/430,297 filed Dec. 2, 2002.

BACKGROUND OF INVENTION

The present invention relates to a vehicle with an opening wherein an enclosure is provided by two movable doors that abut one another.

In the beginning most pickup trucks had a forward cab, which had a rear wall that was closely adjacent to a bench-type seat. As pickup trucks became increasingly popular, a new type of vehicle was developed having an extended cab to provide space rearward of the front bench seat. This space can be utilized for smaller passengers or for an enclosed cargo area. With the development of extended cab pickup trucks, there has come forth a desire for both front and rear side doors to the cab area.

The rear door, often referred to as the access door, typically has two release handles. One handle is located on the interior of the access door, while the other is typically placed on an exterior panel or shut face of the access door that faces an abutting shut face of the front door. Most access doors are configured not to open unless the front door is open.

It is desirable to provide a vehicle with a rear access door having only one release handle to open the access door either from the interior or from the exterior of the vehicle. It is also desirable to provide such a vehicle wherein the handle can be pulled inward to release the access door or wherein the handle can be pulled outward to release the access door.

SUMMARY OF INVENTION

To make manifest the above delineated desires, a relevation of the present invention is brought forth. In the preferred embodiment, the present invention provides a vehicle having a body with an interior and an exterior. The vehicle body has an opening with first and second extreme ends. Adjacent to the first end of the opening is a pivotally connected first or front door. Pivotally connected adjacent to the second end of the opening is a second or rear access door. The access door has a latch connection with the vehicle body between the vehicle body opening first and second ends.

To release the latch connection, a release handle mechanism is connected to the access door along the interior wall of the access door. From the interior of the vehicle, a grip of the release handle mechanism can be pulled inward to allow the access door to open. The grip of the release handle extends beyond the forward extreme end of the access door. Accordingly, the same release handle grip can be reached from an exterior of the door (when the front door is open) to be pulled outward to release the access door from the exterior of the vehicle.

It is an advantage of the present invention to provide a vehicle such as an extended cab pickup truck, having an access door that has a single release handle mechanism which is accessible from the exterior when the front door is open or accessible from the interior regardless of the position of the front door.

It is an advantage of the present invention to provide the above-noted vehicle wherein the release handle mechanism is deactivated whenever the front door is closed.

The above and other advantages of the present invention will be more apparent to those skilled in the art as the invention is further described in the accompanying drawings and detailed description.

DETAILED DESCRIPTION

Figure 1:
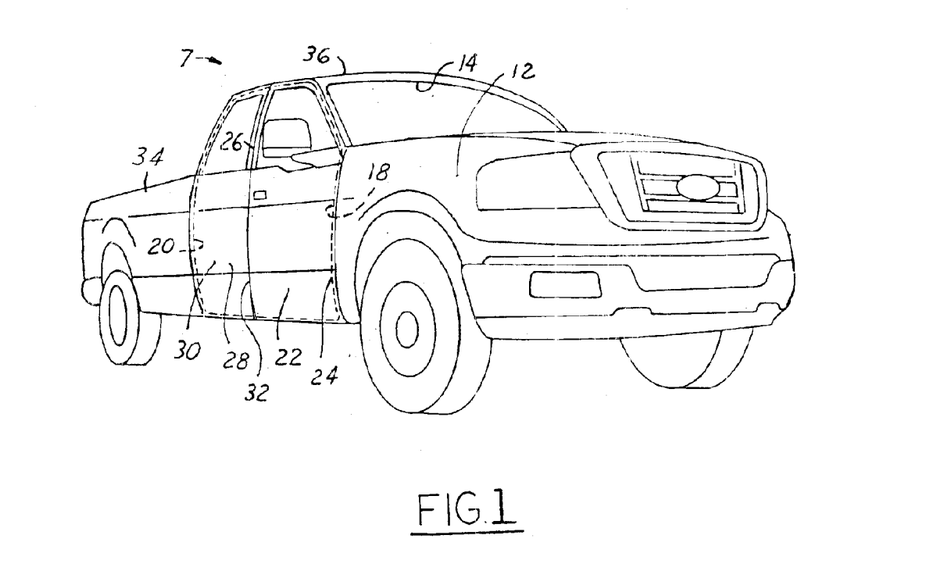
FIG. 1 is a perspective view of the vehicle according to the present invention.
Figure 2:
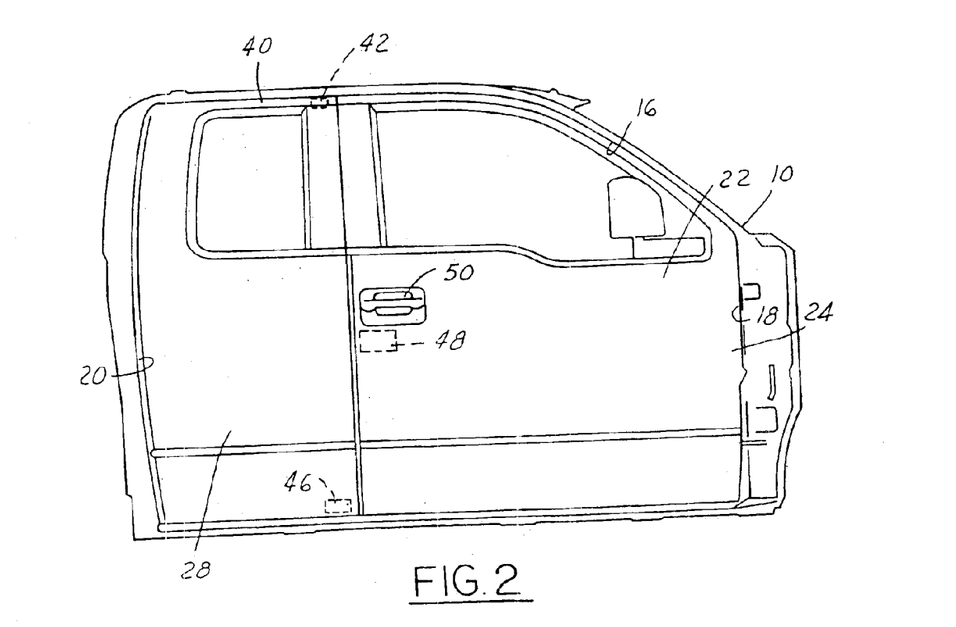
FIG. 2 is a side elevational view of the vehicle shown in FIG. 1.
Figure 3:
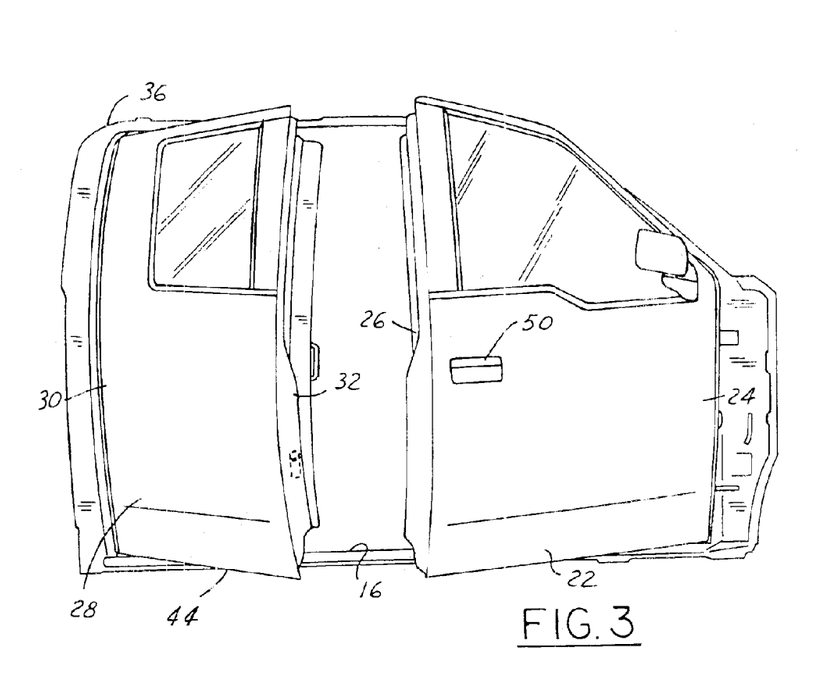
FIG. 3 is a side elevational view with doors of the vehicle shown in a partially open position.
Figure 4:
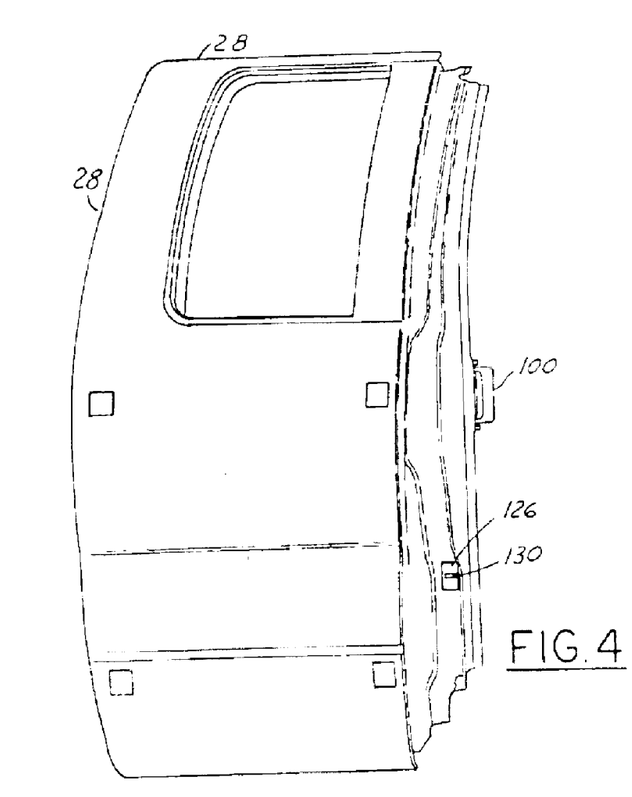
FIG. 4 is an enlarged exterior side elevational view of the rear door shown in FIGS. 1 through 3.

Referring to FIGS. 1, 2 and 3, a vehicle 7 according to the present invention is provided. The vehicle 7 is a pickup truck having a body 10. The vehicle body 10 has an exterior 12 and an interior 14. Connecting the vehicle body exterior and interior is a pillarless side opening 16. The side opening 16 has a first or front extreme end 18 and a second or rear extreme end 20.

Providing a movable barrier for a front portion of the opening 16 is a movable front or first door 22. The front door 22 has a front end 24 which is pivotally connected via hinges to the vehicle body 10 adjacent the front end 18 of the side opening. The front door 22 has an extreme end 26 generally opposite its pivotal connection to the body 10.

Providing a barrier for a rear portion of the opening 16 is a movable rear access or second door 28. The second door 28 has a rear end 30 which is pivotally connected to the vehicle body 10 adjacent the rear end 20 of the side opening. The rear door has an extreme end 32 generally opposite its pivotal connection to the body 10. When doors 22, 28 are closed, the extreme end 26 of door 22 overlaps the extreme end 32 of door 28.

On its rearward end, the vehicle 7 has a pickup bed 34 which is typically separated by a gap from a rearward end of the truck cab body 36.

Referring additionally to FIGS. 4–14 and 21–23, the second door 28 along its upper end 40 has a latch connection 42 with the body 10 between the front and rear ends 18 and 20 of the body opening. The second door 28 also has along a bottom end 44 a latch connection 46 with the vehicle body 10 which is between the front and rear ends 18 and 20 of the side opening 16. When closed (FIGS. 1 and 2), the first door 22 has a latch connection 48 with the second door 28. The latch connection 48 is moved from an open and a closed position by a front door handle 50.

Figures 19, 20, 21:
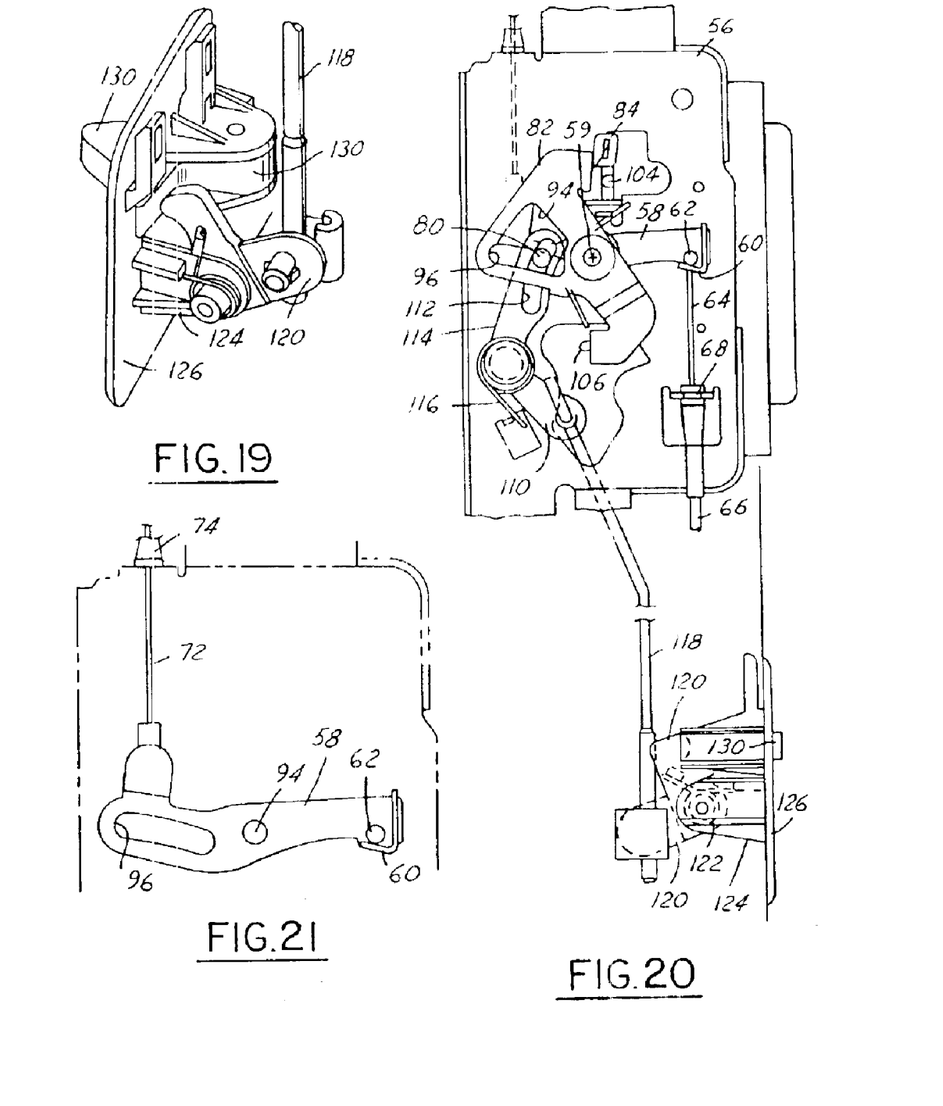
FIG. 21 illustrates a link of the release handle mechanism shown in FIGS. 22 and 23 with other links removed for clarity of illustration.
Figures 22, 23:
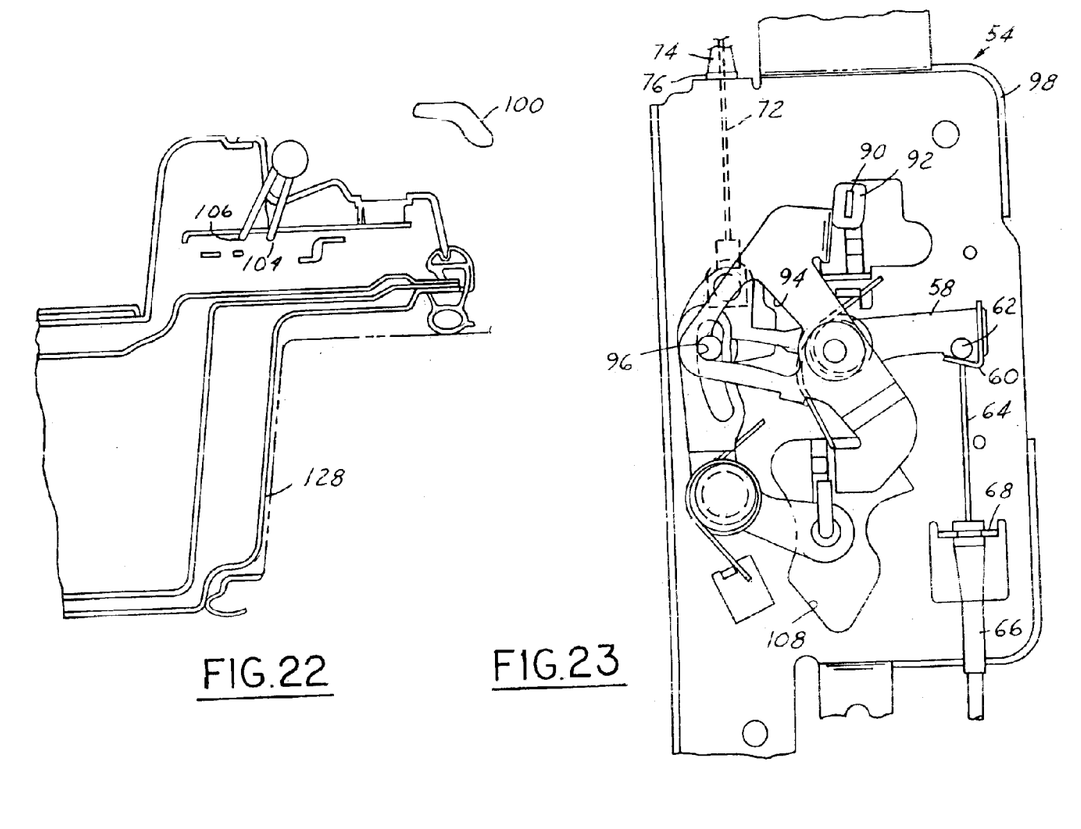
FIGS. 22 and 23 are views similar to FIGS. 12 and 13 illustrating the position of the release handle at rest.

A release handle mechanism 54 is connected to an interior wall 52 of the second door 28. FIGS. 21–23 illustrate the release handle mechanism at rest position. The release handle mechanism includes a plate 56 (sometimes referred to as the brain plate assembly), that is fixably connected to an interior wall 52. In a manner well known in the art, the plate 56 will be concealed from view of an occupant of the vehicle 7 by appropriate interior door trim.

A first lever 58 is pivotally connected on the plate 56 along a first axis 59. The first lever 58 has a tab 60, that has a slot which entraps a crimp ball 62. The crimp ball 62 is connected with a force transmission member which is provided by a release cable 64. The release cable 64 has an outer sheath 66 which is crimped by a tab 68 of the plate 56. Upon an upward movement by tab 60, the release cable 64 causes the latch connection 46 to release itself from a striker bar (not shown) adjacent the body opening 16.

Another tab 70 is located on an end of the first lever 58 which is generally opposite the first pivot axis 59 from the tab 60. The tab 70 is connected with a force transmission member provided by a release cable 72. The release cable 72 has a sheath 74 which is affixed with a tab 76 of the plate 56. Downward movement of the tab 70 causes a pull on the release cable 72 to release latch connection 42 with a striker (not shown) that is positioned on the top portion of the vehicle body opening 16.

The first lever 58 also has a longitudinal generally arcuate pin slot 78. The pin slot 78 has captured therein a slot pin 80. The release handle mechanism additionally has pivotally connected along the first axis 59 a second pivot lever 82. The second pivot lever 82 has an inward bent tab 84 which forms a first contact surface and a lower tab 86 which forms a second contact surface. The second pivot lever 82 is torsionally biased by a spring 88 such that tab 84 rests upon a bumper 92 of a tab stop 90. The tab stop 90 is formed from the plate 56. The second lever 82 has an almost triangular pin slot 94. The pin slot 94 at its lower left hand corner has semi-circular detent portion 96 which encircles the slot pin 80 approximately 150 degrees.

Fixably connected to the plate 56 is a bezel 98. A grip lever 100 is pivotally mounted to the bezel about pivot pins 101 that align with a generally horizontal second axis 102. The grip lever 100 extends forward from an extreme end 32 of the second door. Accordingly, the grip lever 100 is accessible from an exterior of the vehicle body 10 when the first door 22 is open. The grip lever has a first finger 104 which extends in a generally horizontal direction generally perpendicular and radial to the second axis 102. The first finger 104 extends through an upper opening 105 in the plate 56.

Figure 8:
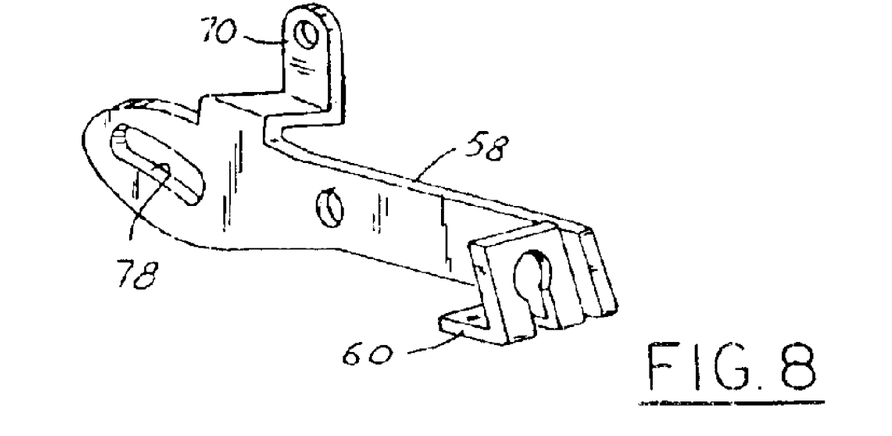
FIG. 8 is a perspective view of one of the levers in the release handle mechanism shown in FIG. 13.

Pulling the grip lever 100 towards the exterior of the vehicle body 7 (FIGS. 12 and 13) causes the first finger 104 to contact the tab 84 to cause the second pivot lever 82 to rotate in a first angular counterclockwise direction (FIG. 8). The counterclockwise rotation of the second pivot lever 82 causes it to force the first pivot lever 58 to rotate counterclockwise by virtue of the entrapped slot pin 80 imparting the movement of the second pivot lever 82 to the first pivot lever 58. The counterclockwise rotation of the first pivot lever 58 causes a pull upon release cables 64, 72, which unlatches the second door 28 from its latch connections 42 and 46 with the vehicle body opening 16.

Figure 5:
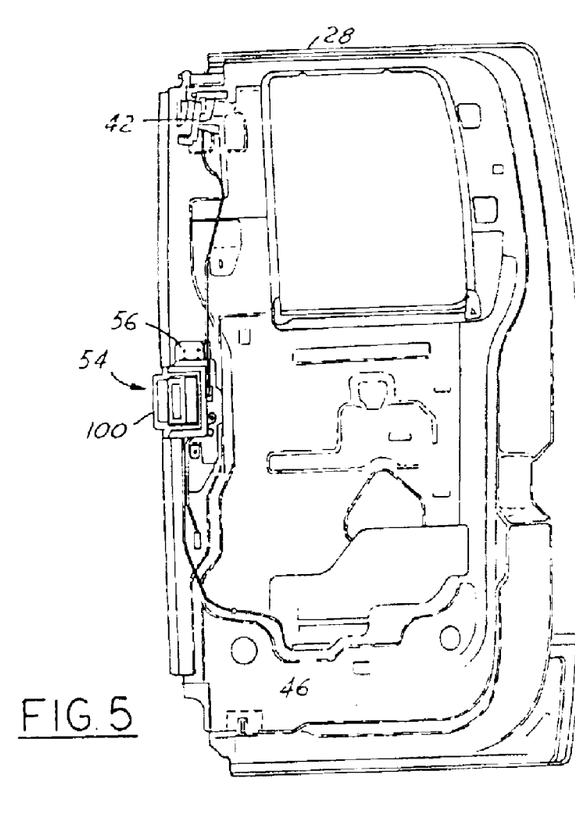
FIG. 5 is an interior view of the rear door shown in FIG. 4 with portions of the trim removed for clarity of illustration.
Figures 6, 7:
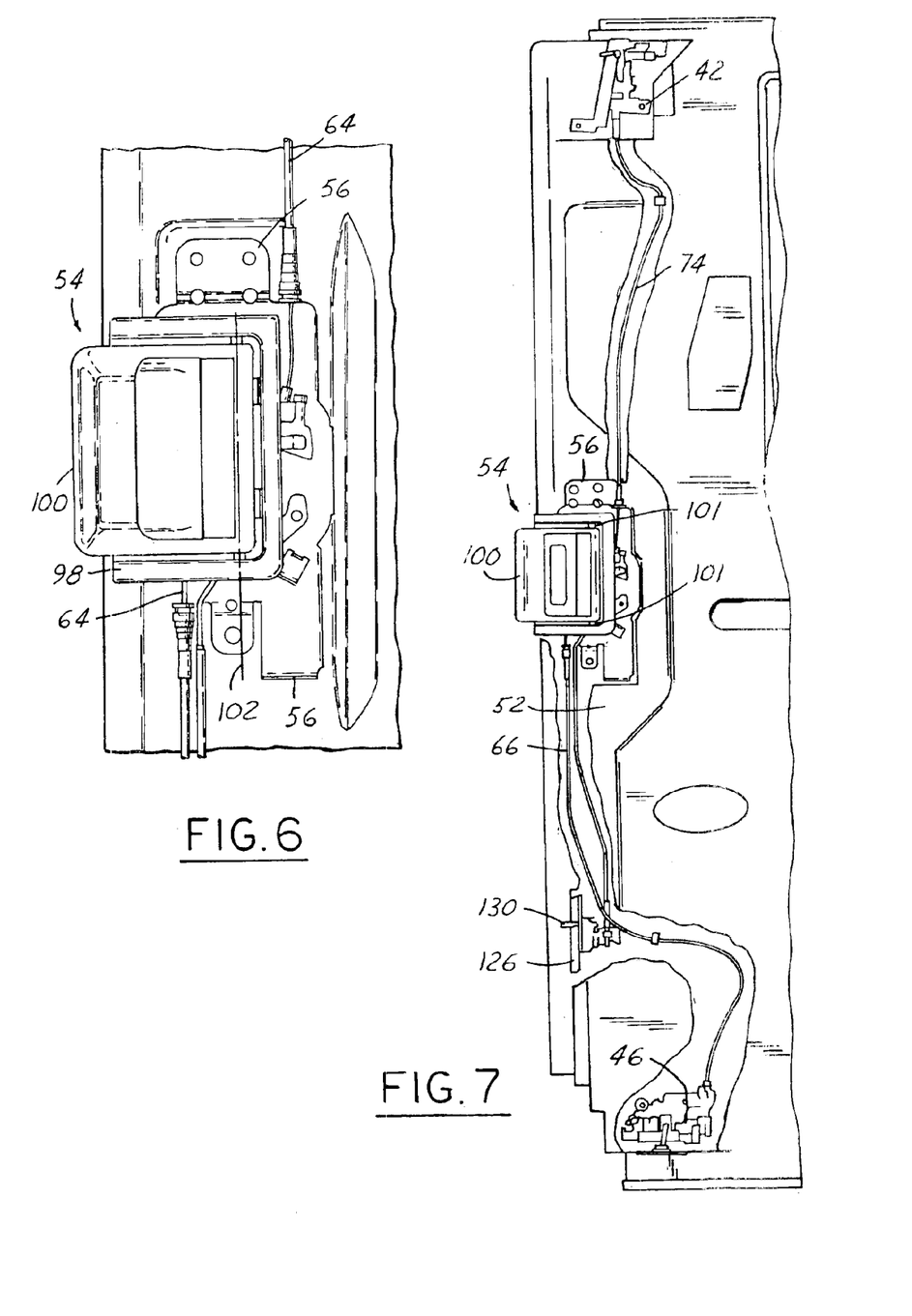
FIG. 6 is an enlarged partial side elevational view taken from the interior of the vehicle shown in FIG. 5 illustrating a release handle mechanism for the rear door.
FIG. 7 is a diagrammatic view of the release handle shown in FIG. 6 along with the forced transmission members to the upper and lower latches and also to a key utilized in a lock out system.

The grip lever 100 also has a lower, second finger 106. The second finger 106 extends within a lower opening 108 provided in the plate 56. The second finger extends slightly leftward radially with respect to the first finger 104 (FIGS. 12–15). As seen in FIG. 5 the grip lever 100 is always accessible from the interior of the vehicle body 7 even when the first door 22 is closed.

Pulling the grip lever 100 towards the interior (FIGS. 14 and 15) of the vehicle causes the second finger 106 to contact the tab 86 of the second pivot lever 82. Again, this motion causes the second pivot lever 82 to rotate in a counterclockwise direction (FIG. 15) and accordingly, the latch connections 42 and 48 are released from their respective strikers.

Figure 9:
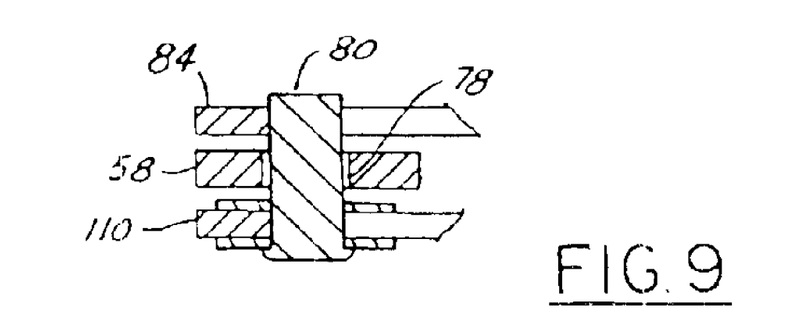
FIG. 9 is a sectional view taken along the slot pin shown in FIG. 13.
Figure 10:
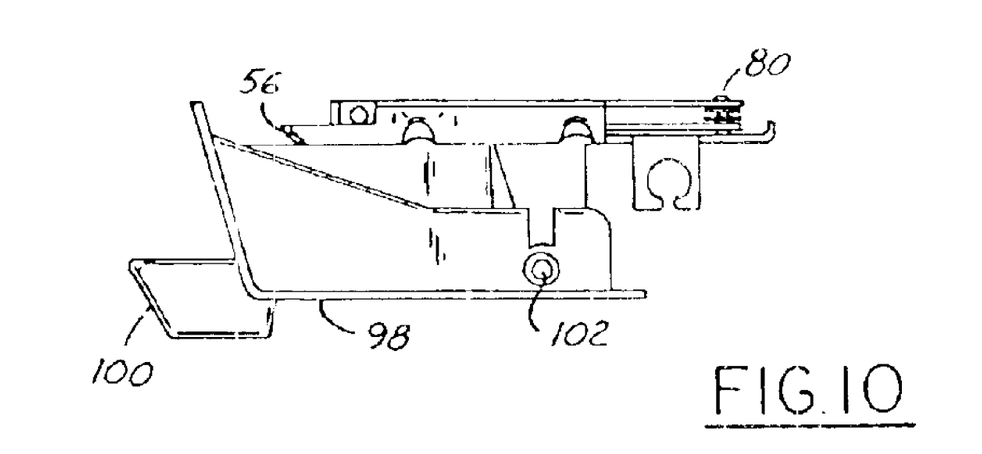
FIG. 10 is a top elevational view of a bezel of the present invention along with portions of the surrounding hardware.
Figure 11:
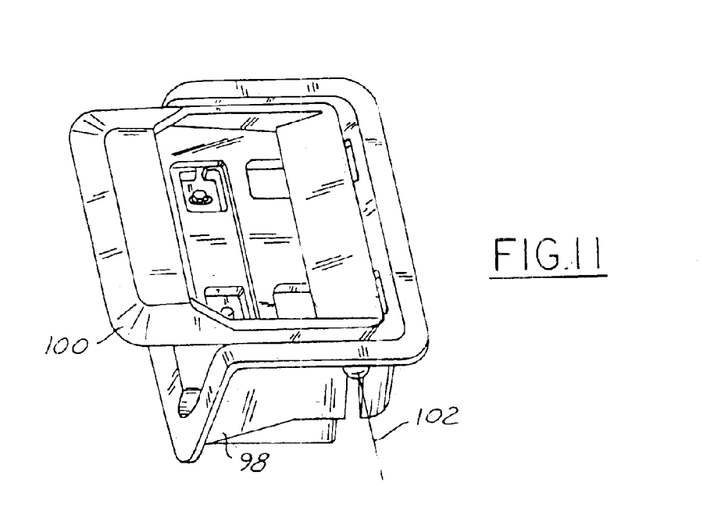
FIG. 11 is a perspective view of the release handle and bezel shown in FIG. 10.
Figure 12:
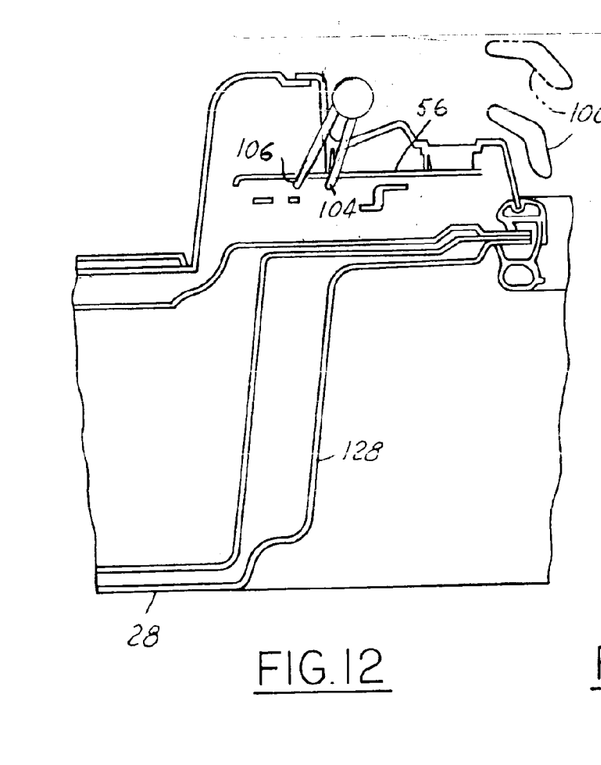
FIG. 12 is a sectional view illustrating movement of the release handle towards an exterior of the vehicle.
Figure 13:
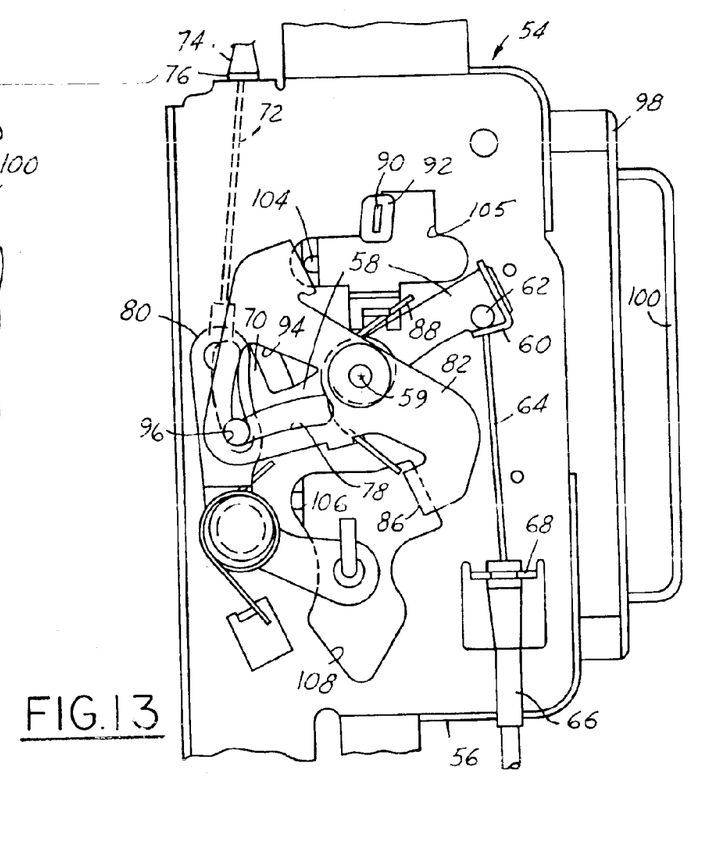
FIG. 13 is a side elevational view of the portion of the release handle mechanism corresponding to the action of the release handle shown in FIG. 12.
Figures 14, 15:
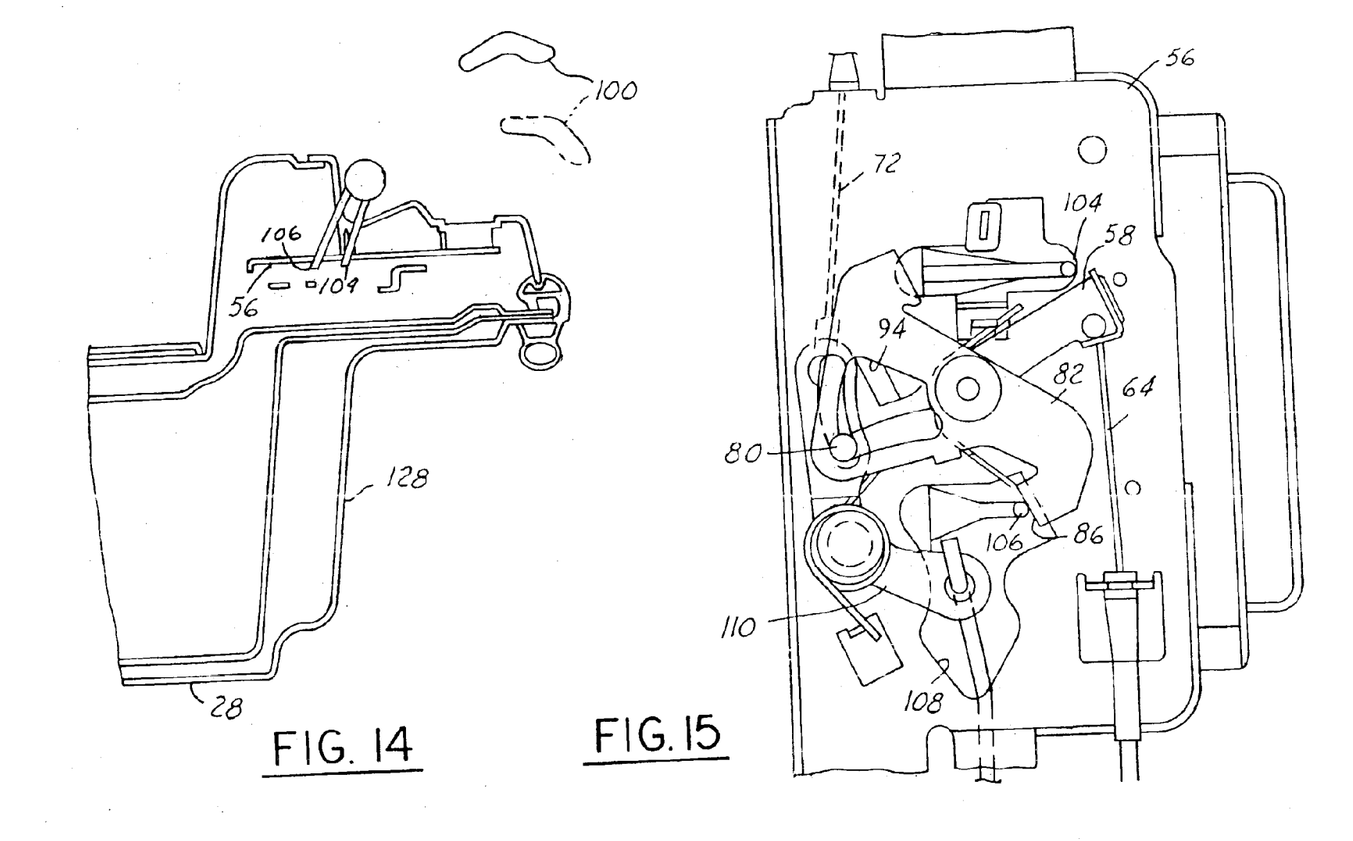
FIGS. 14 and 15 are views similar to FIGS. 12 and 13 illustrating movement of the release handle towards an interior of the vehicle.
Figure 16:
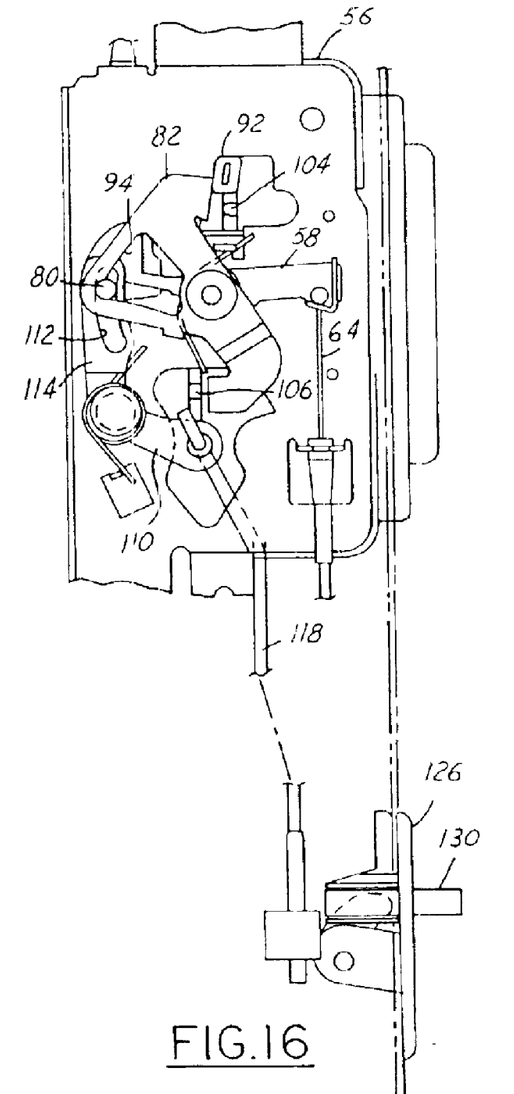
FIGS. 16, 18 and 19 illustrate portions of the lock out feature of the present invention which allows the door release mechanism to operate when the front door is open.
Figure 17:
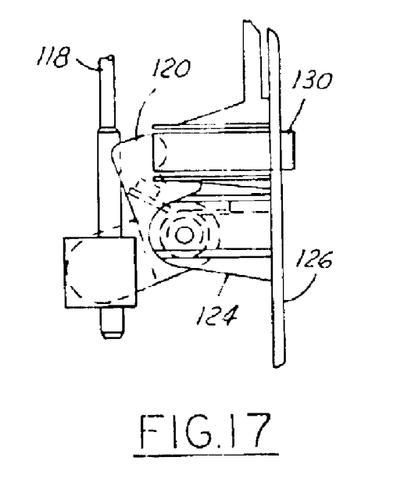
FIGS. 17 and 20 illustrate operation of the lock out mechanism when the front door is closed, effectively deactivating the release handle mechanism.
Figure 18:
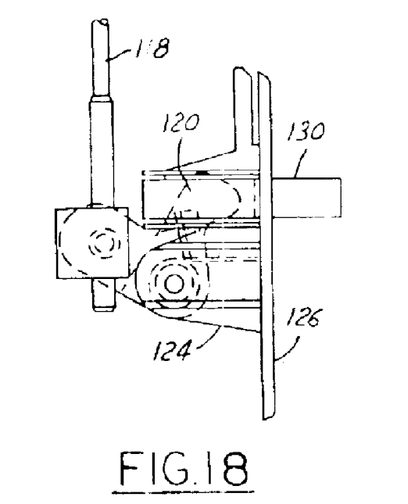

Referring to FIGS. 16–20, the release handle mechanism 54 also has a lock-out lever 110. The lock-out lever 110 has a longitudinal generally arcuate pin slot 112 on one of its arms 114. The lock-out lever 110 is pivotally biased by a spring 116 in a counterclockwise direction. The pin slot 112 also captures the slot pin 80. The slot pin 80 typically will have double parallel spaced heads which are juxtaposed by the lateral thickness of the lock-out lever 110 (FIG. 9).

The lock-out lever 110 is pivotally connected with a rod 118. The rod 118 is pivotally connected with an L-shaped lever 120. The L-shape lever 120 is pivotally biased by a spring 122. The L-shaped lever 120 is pivotally connected on a boss 124 which projects from a face plate 126. The face plate 126 is mounted to be generally flush with a strut wall 128 (FIG. 14) of the second door 28. The boss 124 also pivotally mounts a generally triangular key member 130.

The spring biasing of the L-shaped lever 120 causes it to urge the key member 130 away from the face plate 126. If the first door 22 is open, the key member 130 will pivot outward from the face plate 126 causing the L-shaped lever to pivot generally clockwise to the position shown in FIGS. 18 and 19, causing the rod 118 to be pushed upward by virtue of its pivotal connection with the L-shaped lever 120.

The upward movement of the rod 118 will cause the lock-out lever to be urged in a generally counterclockwise direction (FIG. 16) causing the slot pin 80 to be engaged or captured within the detent portion 96 of the second pivot lever 82. Accordingly, motion of the second pivot lever 82 imparted by either pulling or pushing on the grip lever 100 will cause unlatching of the second door 28.

If the first door 22 is closed, the key member 130 will push inward against the action of the spring 122 and the L-shaped lever will pivot in a generally counterclockwise direction (shown in FIGS. 17 and 20) causing the rod 118 to be pulled downward. The above action will cause the lock-out lever 110 to rotate in a clockwise direction (FIG. 20). The clockwise rotation of the lever 110 will cause the slot pin 80 to be taken out of the detent portion 96 of the second lever 82 and accordingly, the slot pin 80 will be in a portion of the pin slot 94 of the second pivot lever wherein movement of the second pivot lever 82 will not move the slot pin 80.

When movement of the second pivot lever 82 does not impart movement to the slot pin 80, the release mechanism 54 is deactivated and the grip lever 100 can be pushed or pulled without effecting release of the latch connections 42 and 48. Accordingly, whenever the first door 22 is closed, the release mechanism 54 is essentially deactivated.

The latch connections 42, 46 and 48 can be of several types which are conventional in the art and may be similar or identical to those shown and described in commonly assigned U.S. Pat. No. 6,059,352, the disclosure of which is incorporated by reference. In other embodiments not shown, the upper and lower latch connections 42, 46 can be activated by rods rather than cables.

In another embodiment of the present invention (not shown) the vehicle first and second doors are rear Dutch doors of a van or sport utility type vehicle.

The present invention has been described in a preferred embodiment, however it will be apparent to those skilled in the art of the various changes and modifications which can be made to the invention without departing from the spirit or scope of the invention as it is encompassed and defined by the following claims.

What is claimed is:

1. A vehicle comprising:
   a vehicle body with an interior and an exterior having an opening with first and second ends;
   a first movable door providing a barrier for a first portion of said opening;
   a second movable door providing a barrier for a second portion of said opening, said second door having a latch connection with said vehicle body between said opening first and second ends; and
   a release handle for said second door, said release handle extending past an extreme end of said second door, said release handle being accessible from the interior of said vehicle body when said first door is closed or open, and said release handle being accessible from the exterior of said vehicle body when said first door is open.

2. A vehicle as described in claim 1, wherein said first door, when closed is latchably connected to said second door.

3. A vehicle as described in claim 1, wherein said first door is pivotally connected to said vehicle adjacent said opening first end and said second door is pivotally connected to said vehicle adjacent said opening second end.

4. A vehicle as described in claim 1, wherein said first and second doors are side doors of said vehicle and said vehicle has a pickup bed rearward of said second door.

5. A vehicle as described in claim 1, wherein said first door, when closed has a portion which overlaps said second door.

6. A vehicle as described in claim 1, wherein said second door has the latch connection with said vehicle body adjacent a top end of said second door and adjacent a bottom end of said second door.

7. A vehicle as described in claim 1, wherein said release handle can be pulled inward to release said second door.

8. A vehicle as described in claim 1, wherein said release handle can be pulled outward to release said second door.

9. A vehicle as described in claim 7, wherein said release handle can be pulled outward to release said second door.

10. A vehicle as described in claim 1, wherein said release handle is disabled when said first door is closed.

11. A vehicle comprising:
    a vehicle body with an interior and an exterior having a side opening with first and second ends;
    a first door providing a barrier for a first portion of the opening pivotally attached to said first end of said opening;
    a second door providing a barrier for a second portion of said opening, said second door having a latch connection with said vehicle body between said opening first and second ends, and said second door being pivotally connected to said vehicle body adjacent said opening second end, a second door extreme end opposite said pivotal connection with said body being overlapped by said first door when said first door is closed; and
    a release handle for said second door accessible from an interior of said vehicle extending beyond said second door extreme end opposite said second door pivotal connection with said vehicle body, and said handle being accessible from said exterior of said body when said first door is open and said release handle unlatches said second door latch connection when pulled outward or inward and wherein said release handle is deactivated when said first door is closed.

12. A method of providing a barrier to a vehicle body having an interior and an exterior with an opening with first and second ends comprising:
    pivotally connecting to said opening first end a first door;
    pivotally connecting to said opening second end a second door having an extreme end overlapped by an extreme end of said first door;
    latching said second door to said vehicle body between said opening first and second ends; and
    connecting on an interior of said second door a release handle which extends beyond said second door extreme end, said release handle being accessible from the exterior of said vehicle body when said first door is open, and wherein pulling said handle inward or pulling said handle outward releases said second door from being latched with said vehicle body to allow said second door to be pivoted outward when said first door is open.

13. A vehicle comprising:
    a vehicle body with an interior and an exterior having an opening with first and second ends;
    a first movable door providing a barrier for a first portion of said opening;
    a second movable door providing a barrier for a second portion of said opening, said second movable door having a latch connection with said vehicle body between said opening first and second ends;
    a release handle for said second door accessible from an interior of said vehicle and being accessible from an exterior of said vehicle when said first door is open, allowing said second door to be unlatched from said vehicle body, said release handle being part of a mechanism including:
    a first lever for activating a force transmission member to release said latch connection, said first lever being pivotally connected to said second door along a first axis, said first lever having a pin slot;
    a pin captured within said pin slot;
    a second lever pivotally connected to said second door along said first axis and spring biased against a stop, said second lever having first and second contact surfaces and said second lever having a pin slot capturing said pin;
    a grip lever pivotally connected with said second door along a second axis having first and second fingers for contact with said second lever at said first and second contact surfaces wherein pivotal movement of said grip lever in a first pivotal direction causes said first finger to contact said second lever first contact surface to pivot said second lever in a first pivotal direction and, wherein pivotal movement of said grip lever in a second pivotal direction causes said grip lever second finger to contact said second lever second contact end to pivot said second lever in said first pivotal direction; and a lock-out lever pivotally connected to said second door along a third pivotal axis having a pin slot capturing said pin wherein in a first position said lockout lever positions said pin so that pivotal movement of said second lever is transferred to said first lever and wherein said lockout lever in a second position positions said pin wherein pivotal movement of said second lever is not transferred to said first lever.

14. A release handle mechanism for a vehicle door having a latch for connecting said door with a vehicle body, said release handle mechanism being connected by a force transmission member with said latch, said release handle mechanism including:

a first lever for activating said force transmission member to release said latch, said first lever being pivotally connected to said door along a first axis, said first lever having a pin slot;

a pin captured within said pin slot;

a second lever pivotally connected to said door along said first axis and spring biased against a stop, said second lever having first and second contact surfaces and said second lever having a pin slot capturing said pin;

a grip lever pivotally connected with said door along a second axis having first and second fingers for contact with said second lever at said first and second contact surfaces wherein pivotal movement of said grip lever in a first pivotal direction causes said first finger to contact said second lever first contact surface to pivot said second lever in a first pivotal direction and, wherein pivotal movement of said grip lever in a second pivotal direction causes said grip lever second finger to contact said second lever second contact surface to pivot said second lever in said first pivotal direction.

15. A release handle mechanism as described in claim 14, wherein a lockout lever is pivotally connected to said door along a third pivotal axis having a pin slot capturing said pin wherein in a first position said lockout lever positions said pin so that pivotal movement of said second lever is transferred to said first lever and wherein said lockout lever in a second position positions said pin wherein pivotal movement of said second lever is not transferred to said first lever.

16. A vehicle comprising:

a vehicle body with an interior and an exterior having an opening with first and second ends;

a first movable door providing a barrier for a first portion of said opening;

a second movable door providing a barrier for a second portion of said opening, said second door having a latch connection with said vehicle body between said opening first and second ends; and a release handle for said second door, said release handle being accessible from the interior of said vehicle body when said first door is closed or open, and said release handle being accessible from the exterior of said vehicle body when said first door is open, and wherein said release handle can be pulled outward to release said second door.

17. A vehicle as described in claim 6, wherein said handle extends past an extreme end of said second door.

18. A vehicle as described in claim 16, wherein said first door, when closed is latchably connected to said second door.

19. A vehicle as described in claim 16, wherein said first door is pivotally connected to said vehicle adjacent said opening first end and said second door is pivotally connected to said vehicle adjacent said opening second end.

20. A vehicle as described in claim 16, wherein said first and second doors are side doors of said vehicle and said vehicle has a pickup bed rearward of said second door.

21. A vehicle as described in claim 16, wherein said first door, when closed has a portion which overlaps said second door.

22. A vehicle as described in claim 16, wherein said second door has the latch connection with said vehicle body adjacent a top end of said second door and adjacent a bottom end of said second door.

23. A vehicle as described in claim 16, wherein said release handle can be pulled inward to release said second door.

24. A vehicle as described in claim 16, wherein said release handle is disabled when said first door is closed.

* * * * *